UNITED STATES PATENT OFFICE.

STEPHEN M. ALLEN, OF WOBURN, MASSACHUSETTS.

IMPROVED ARTIFICIAL-LEATHER BELTING.

Specification forming part of Letters Patent No. 73,427, dated January 21, 1868.

Be it known that I, STEPHEN M. ALLEN, of Woburn, county of Middlesex, and State of Massachusetts, have invented a new and Improved Artificial-Leather Belting, for running machinery, which I call "artificial-leather water-proof belting."

In order to enable others to understand and make my improved artificial-leather belting, I hereby give the following description of the preparation of the stock, its combinations, and the mechanical process of making the same, as differing from my previously-described process, patented the 13th of March, 1866, in which I took the ordinary scraps or waste of tanneries, or scraps of untanned skins, in connection with vegetable fiber, and pulped the same for use without any special combinations of the parts, which I now find of great importance, and for the use of which I ask Letters Patent.

I take ordinary scrap-leather, though preferring the skivings or shavings of the cuticle, from tanneries, shoemakers' or curriers' shops, and soak and wash the same before or during the process of pulping, sometimes with pure cold or warm water, and sometimes using alkalies, or any other property which will separate the tannin from the scraps of leather, so that when pulped and dried the fiber will adhere strongly together, and be less likely to absorb moisture. I then prepare the untanned scraps of hides, sometimes in lime solutions or solutions of salts, so as to remove the stiffness when dry, without destroying either the fiber itself or the adhesive properties of the glue or gelatine in the same. When the fiber is thus prepared the tanned and untanned fiber will readily unite in combination, and will also unite with vegetable fiber, either with or without other gelatinous or resinous substances while pulping. I sometimes add to the combination of fibrous substances, when the same is being pulped, a proper quantity of bullock's or animal blood, which, with the previous preparation of the animal fiber, as before described, will make nearly a water-proof sheet of artificial leather, and the same will not be susceptible of absorbing moisture, so as to cause a belt to contract or expand, either under the influence of heat or a humid atmosphere. When properly pulped the same may be run off on an ordinary paper-machine or between rollers, and doubled to a proper thickness, and may be used either with or without further preparation, by printing, japanning, stitching, or water-proof applications. I usually subject the belting to a high temperature of heat, to set the gluten and other resinous properties, and sometimes vulcanize the same, though for ordinary use it is not necessary.

Having thus described my new artificial-leather belting and the improved processes in preparing the material for the same, as well as the combinations which my experience has proved to be valuable in the process of mixing the stock for and making artificial-leather belting, I claim—

1. A new artificial-leather belting and banding for driving machinery, made by combining tanned and untanned scraps of skins or hides, after preparation, with vegetable fiber, pulped and run off into sheets, substantially in the manner and for the purposes herein set forth.

2. As a new article of manufacture, belting and banding for driving machinery, made by combining tanned and untanned animal fiber with vegetable fiber, and by the further combination of bullock's blood or fibrine, the same being manufactured substantially as and for the purposes above described.

In testimony whereof I have signed my name to this specification before two subscribing witnesses.

STEPHEN M. ALLEN.

Witnesses:
L. BURNETT,
M. BAILEY.